(12) United States Patent
Coburn

(10) Patent No.: US 6,703,447 B2
(45) Date of Patent: Mar. 9, 2004

(54) HIGH BI-DIRECTIONAL STRENGTH MONOLAYER POLYMERIC FILM AND METHOD OF FABRICATION

(76) Inventor: Theodore R. Coburn, 190 Mike St., North Kingston, RI (US) 02854

( * ) Notice: Subject to any disclaimer, the term of this patent is extended or adjusted under 35 U.S.C. 154(b) by 218 days.

(21) Appl. No.: 09/774,438

(22) Filed: Jan. 30, 2001

(65) Prior Publication Data

US 2001/0012548 A1 Aug. 9, 2001

Related U.S. Application Data

(63) Continuation-in-part of application No. 09/198,667, filed on Nov. 23, 1998, now abandoned.
(60) Provisional application No. 60/066,492, filed on Nov. 24, 1997.

(51) Int. Cl.⁷ .......................... C08L 23/00; C08L 23/04; C08L 25/02; C08L 33/04; C08L 35/02
(52) U.S. Cl. ....................... 525/291; 525/222; 525/232; 525/240; 525/241
(58) Field of Search ................................. 525/191, 222, 525/232, 240, 241

(56) References Cited

U.S. PATENT DOCUMENTS

| | | |
|---|---|---|
| 5,108,884 A | 4/1992 | Shibata et al. |
| 5,186,782 A | 2/1993 | Freedman |
| 5,435,963 A | 7/1995 | Rackovan et al. |
| 5,451,283 A | 9/1995 | Josephy et al. |
| 5,521,003 A | 5/1996 | Lo et al. |
| 5,654,364 A | 8/1997 | Bates et al. |
| 5,965,654 A * | 10/1999 | Hirata et al. ................. 524/451 |
| 5,998,019 A * | 12/1999 | Rosenbaum et al. ......... 428/345 |
| 6,051,655 A * | 4/2000 | Nakano et al. .............. 524/502 |

* cited by examiner

Primary Examiner—Nathan M. Nutter
(74) Attorney, Agent, or Firm—Chris A. Caseiro; Verrill & Dana, LLP

(57) ABSTRACT

A polymeric film and method for making the film. Mixing a structural material with a secondary material to form a unitary mixture prior to processing forms the film. For a printable film, the secondary material is a printable material. The unitary mixture is extruded and heated so as to cause the printable material to bloom to the surface of the mixture. The result is a film that is stiffer and that lays flatter than prior multi-layered films that were prone to curling. The rollers used to stretch the film during this heat-setting stage are preferably very smooth so as to enhance the transverse-direction strength and stiffness of the film. In another embodiment of the invention, the secondary material is a clarity-enhancing material that may be styrene-ethylene-butadiene-styrene block copolymer. The blend combination is a suitable replacement for polyvinyl chloride films in that it is soft, conformable, flexible and clear.

7 Claims, 1 Drawing Sheet

HIGH BI-DIRECTIONAL STRENGTH MONOLAYER POLYMERIC FILM AND METHOD OF FABRICATION

CROSS-REFERENCE TO RELATED APPLICATIONS

This application is related to U.S. application Ser. No. 08/948,869, filed Oct. 10, 1997, entitled Monolayer Polymeric Film And Method Of Fabrication filed by the same inventor of the present invention, now U.S. Pat. No. 6,136,439. This application is a Continuation-In-Part of U.S. application Ser. No. 09/198,667, of the same title and by the same inventor, filed Nov. 23, 1998 and now abandoned and claiming the priority of U.S. Provisional Application Ser. No. 60/066,492, filed Nov. 24, 1997, of the same title and by the same inventor.

BACKGROUND OF THE INVENTION

1. Field of the Invention

The present invention relates to polymeric films used for a wide variety of purposes. More particularly, the present invention is related to polymeric films that act as substrates or facestock for labels, and many other film-based products. Still more particularly, the present invention is related to monolayer polymeric film products that are subsequently printed with a variety of printing systems. The present invention is directed to machine-direction-oriented film for label stock, particularly those having a relatively high degree of conformability to flexible structures on which they are placed.

2. Description of the Prior Art

It is well known that labels, tapes, decals, etc., are widely accepted means for conveying information. For many years, the information was printed on a thin paper product that either had a pressure-sensitive adhesive backing, or that was otherwise adhere to the surface of interest. Paper was used, and continues to be used, because it has sufficient flexibility and toughness to conform to various surfaces without tearing—at least without tearing immediately.

A further advantage of paper is its ability to accept print applied in the variety of ways that print is applied, including, but not limited to, offset, thermal transfer, letterpress, rotogravure, flex, and screen. That is, the print can easily be applied without concern that it will separate from the paper substrate.

At least one disadvantage in the use of paper as a label substrate is its moisture absorbency. This characteristic can cause a reduction in tear strength as well as a reduction in shelf life. Other problems with paper labels include curling of the material and the general aesthetics of the paper. In order to overcome these and other disadvantages in the use of paper as a label substrate, viscoelastic, or polymeric, films have been developed. Polymeric films—including those made with polyethylene or polypropylene as the foundation component—have been developed as substitutes for paper label substrates. This material is relatively inexpensive to obtain and to fabricate in the thickness range of interest and noted. It also has a higher tear strength than paper. Further, it is much more moisture resistant than paper. Two disadvantages of note, however, include the ability of polymeric films to conform to flexible items to which they are affixed, and the difficulty in getting polymeric films to accept print of the types described.

Fairly recent developments in polymeric film fabrication have addressed the problem of conformance to flexible surfaces. That problem occurs, for example, when a label is affixed to a bottle or container made of a flexible material—such as a plastic beverage container, a toothpaste tube, or a shampoo bottle for example. The label must be sufficiently flexible to conform to changes in the container surface, when, for example, the bottle is squeezed. The label must, however, be tough enough to remain intact under those conditions so that the information thereon remains visible. The primary means for addressing this issue has been the introduction of a film-processing step that substantially aligns the molecular structure of the polymer as it is being stretched to its desired thickness. The polymers that have been used most commonly include either cast polyethylene or plasticized polyvinyl chloride (PVC).

It is important to understand in considering the processing of these types of films that the material used is a thermoplastic polymer. That is, the material can be heated to a temperature high enough to cause it to become fluid-like without being a liquid, so that it may be made into virtually any desired shape and is much more "handleable" than thermoset polymers. The shaping of the material is achieved by mechanically stretching or orienting the polymer chains in a particular way. As the material is chilled, it solidifies into the desired shape, albeit with some shrinkage as crosslinking occurs. Thermoplastic materials such as polyethylene and PVC may be formed and re-formed in this way into a variety of shapes. Thermoset polymers, on the other hand, can only be processed once. Any subsequent attempts to heat them for re-forming result in irreversible degradation.

In the field of film substrates, the processing of the thermoplastic polymer can be arranged such that the desired film shape—principally an issue of thickness—is achieved, along with the conformability and strength needed for the flexible containers noted. The shaping and strengthening is achieved by stretching an extruded film that is initially about 10–12 mils thick over a plurality of rollers so as to thin it while also orienting the polymeric chains substantially in a single direction. This processing technique has been available for quite some time. One example of it is described in U.S. Pat. No. 5,186,782 issued to Freedman. The Freedman patent describes the orientation of a facestock film so as to provide greater stiffness in that direction while maintaining conformability.

One problem with the prior-art means for producing a conformable film involves the printability of the film. Inherent in the nature of the polymeric materials used to produce these films is the lack of a suitable film surface profile to which print can adhere. In general, fabricated polyethylene and polypropylene lacks sufficient "nooks and crannies" to which print ink can adhere. As a result, the surface of the material must be treated, or a more suitable material must be applied to the surface of the polymer. In the field of plastic films, labels, etc., top-coating treatment of the polymer surface is expensive. Therefore, the industry standard at present is to co-extrude at least a second layer of material with the primary facestock layer, where the second layer more readily accepts print, but does not have the strength of the primary material. Further, it is fairly common for that second material to be applied to both sides of the primary material. The label stock for printing described in the Freedman patent describes this layering of different materials.

It has been determined that vinyl-acetate, generally in an ethylene-vinyl-acetate (EVA) complex but not limited thereto, will accept print of the type commonly used throughout the printing field—whether oil- or water-based.

By forming a multi-layered film, it is possible to produce a relatively inexpensive, printable, and conformable substrate that is of interest to the label industry. A significant drawback to this multi-layer processing, however, relates to the quality of the film provided. Specifically, the layering of two unlike materials, each of which has its own set of optimal processing conditions, yields an inferior product. In particular, the primary material, which, as indicated, may be polyethylene, PVC, or even polypropylene, or a co-polymer of polypropylene and polyethylene, can and should be heated to temperatures on the order of 220° F.–270° F. for proper orientation processing.

Processing at lower temperatures reduces stabilization of the crystalline polymer and thereby reduces the resultant stiffness, flatness, and curl of the film. EVA, on the other hand, softens and/or melts at approximately 220° F. when it is formed as its own distinctive layer. Further, the two dissimilar materials orient (flow) and shrink differently as they are heated, cooled, and solidify. In fact, the amorphous EVA shrinks in a different way than the crystalline structural polymer, particularly as it approaches the desired processing temperature. Because of this dissimilarity, delamination and curling of the multi-layer film is common. In addition, processing at lower temperatures creates a tension in the structural matrix of the film. As a result of these two problems, a label or other type of identifier having such a film facestock is extremely difficult to print, and causes considerable waste as the film either separates, curls, or a combination of the two. Unfortunately, this problem cannot be avoided in that the layering of materials for print labeling forces the manufacturer to process at lower than desired temperatures during heat stabilization.

Another limitation of the prior multi-layered films is the relationship between the strength of the film in the transverse direction (TD) and the strength of the film in the machine direction (MD). (The machine direction relates to the strength of the film in the direction it moves through the processing rollers. The transverse direction relates to the strength of the film in the planar direction perpendicular to the machine direction.) Freedman indicates that a label film's transverse-direction stiffness may be slightly less than ¾ of the film's machine direction stiffness, and preferably less than ½ the machine-direction stiffness. However, as a practical matter, it is difficult, if not impossible, to process a multi-layered film at a temperature sufficient to achieve a TD-stiffness-to-MD stiffness ratio of anything greater than ½. This relates to the vinyl acetate processing temperature limitations noted above, as well as to the design of the rollers presently used to create these films.

Presently, the hot rollers used to stretch and heat-set the films are made with relatively rough surfaces. This has in the past been considered necessary in order to be sure that the film would not stick to the rollers, as it would on a very smooth roller. In that regard, most film processing rollers having chrome surfaces have chrome finishes of no less than 8–12 RMS. However, the gap between successive rollers having these relatively rough surfaces permits the film to shrink, primarily in the transverse direction, as it is being stretched. This is the cause of the difficulty in getting the TD film stiffness to be as close as possible to the MD stiffness. In some applications, such as film labels on flexible containers and the like, equivalency of the MD-to-TD stiffness relationship provides more processing options in that orientation is less critical.

In regard to films fabricated of PVC, the automated dispensing equipment employed to make pliable films of that material has limitations that reduce the cost effectiveness of making the films out of that material. First, it is to be noted that PVC is much denser than the polyolefins such as polyethylene, on the order of 1.4–1.5 specific gravity for PVC to 0.9 specific gravity for the polyolefins. Since film costs are based substantially on weight, the physical characteristics associated with PVC-based films must be substantially greater than that for the polyolefins in order to justify the increased cost per pound. One physical characteristic that does make PVC a desirable film stock is its opacity. PVC films have heretofore been much clearer than polyolefin films. The desire for a clear film can outweigh the cost per pound limitations. Moreover, PVC-based films including impact-resistant additives or co-polymers are softer and more flexible than cast or oriented polyolefins. That softness and flexibility is desirable in graphic arts equipment, dental products, and x-ray folders, for example.

In addition to the higher cost associated with PVC films, is the well-documented environmental concern associated with the use of that polymer. For that reason, it would be desirable to eliminate them substantially from use but without losing the clarity, softness, conformability and flexibility that they establish in films, including printable films.

Therefore, what is needed is a polymeric film substrate that is conformable to an array of surfaces, flexible or otherwise. What is also needed is a polymeric film substrate for labels, tapes, etc., to which a variety of printing inks will adhere. Further, what is needed is a polymeric film substrate that will not delaminate and which Is substantially curl-free. Yet further, what is needed is a polymeric film substrate that can be processed under optimal conditions and with little, if any, increase in the cost typically associated with such fabrication. Still further, what is needed is a polymeric film substrate having increased transverse-direction stiffness without losing its printability. In addition and more generally, what is needed is an economical and relatively environmentally-friendly material, such as something other than PVC, to create a film that is soft, conformable, flexible and clear with sufficient physical characteristics to stand up to the stresses experienced by films applied to pliable base structures.

SUMMARY OF THE INVENTION

It is an object of the present invention to provide a polymeric film substrate that is conformable to an array of surfaces, flexible or otherwise. It is also an object of the present invention to provide such a polymeric film substrate for labels, tapes, etc., to which a variety of printing inks will adhere. It is another object of the present invention to provide such a polymeric film substrate that will not delaminate and which is substantially curl-free. It is yet another object of the present invention to provide a fabrication process to produce such a polymeric film substrate using techniques similar to those used for monolayer and multi-layer films with little, if any, increase in the cost typically associated with such fabrication. It is an object of the present invention to provide a polymeric film substrate having increased transverse-direction stiffness without loss of printability. In addition, it is an object of the present invention to provide a film formed of an economical and relatively environmentally-friendly material, such a film having softness, conformability, flexibility and clarity with sufficient physical characteristics to stand up to the stresses experienced by films applied to pliable base structures.

These and other objectives are achieved in the present invention through the combination of a primary polymer material and a secondary polymer material that are mixed together prior to extrusion as a single layer for subsequent stretching and either bi-, or uni-directional, orientation. In the preferred embodiment of the invention, the primary material is polypropylene of the type commonly used in the fabrication of film substrates. It is to be understood, however, that other materials acting as the structural component of the mixture, may be used, including, but not limited to, polyethylenes such as high-density polyethylene, and co-polymers of polyethylene and polypropylene.

The secondary material is preferably a combination of components that must include enough vinyl-acetate (VA) such that there is a total of at least 5% by weight of VA in the mixture of the primary and secondary materials. The VA may be combined with a VA-carrier material, that may be, but is not limited to, polyethylene, generally identified as EVA, for ethyl-vinyl-acetate. Alternatively, it has been determined that another suitable print carrier material is from the family of acrylics, such as methacrylate (MA) in a carrier identified as ethyl methacrylate (EMA). Of course, VA alone may also be employed, provided the percentage of that material in the mixture is suitable for printing without significant detriment to the structural characteristics of the film.

A feature of the present invention is the mixing together of the VA-(or MA-) containing material and the primary material prior to extruding that mixture for delivery to subsequent processing. This unitary mixture may be processed differently than if the two materials were processed as distinctive layers. The inventor has determined that the unitary mixture may be processed and oriented at a temperature exceeding the permissible temperature for processing of the VA- or MA-containing material. As a result, higher orientation and heat stabilization of the structural polypropylene part of the mix is achieved, thereby making the end product film stiffer while retaining sufficient flexibility to maintain conformability with a variety of substrates. It is also possible to reduce or eliminate curling of the end-product film in that processing at a relatively higher temperature, that may range from 270 deg. F.–295 deg. F., creates the opportunity to heat set and then stress relieve or relax from the high temperature to a lower temperature so as to relax the molecular structure of the film. Since the primary structural material and the secondary printable material are provided in a uniform blend, there is uniform relaxation.

The unitary mixture of the structural primary material and the secondary material is formulated so as to ensure "printability" of the end-product film. In particular, the secondary material contains vinyl-acetate that may be in an EVA matrix. As noted, the printable material may alternatively be vinyl-acetate alone or vinyl-acetate in an ethylene-methacrylate (EMA) matrix. Under the processing temperatures noted, the vinyl-acetate is released, that is, it moves through the mixture matrix, or "blooms" to the surface of the film so as to provide a film surface having at least about 5% by weight of vinylacetate. This quantity of vinyl-acetate in an EVA matrix has been determined to be sufficient for attachment of print ink under any one of the six printing methods previously noted. A similar concentration of methyl-acrylate in EMA works as well.

The film facestock of the present invention is further enhanced by ensuring that the rollers used during the stretching process are as smooth as practical. The rollers have a high-chrome finish that is less than 8 RMS, and preferably about 1–2 RMS. These smoother rollers keep the film on the rollers more tightly than in the past. The film therefore has a more uniform and complete contact than available with the prior rollers. The film thus tends to shrink less in the transverse direction and, by maintaining the film more tightly on the rollers at the noted higher processing temperature, the film crystallizes-heat sets—without shrinking. This better heat setting yields improved film strength and brings the TD stiffness more in line with the MD stiffness—without detriment to the film's printability.

In regard to forming a soft, conformable, flexible, and clear film, that may or may not further be printable, the present invention includes a unitary polymer-polymer mixture. The mixture is a suitable substitute for PVC. Specifically, the mixture includes a polyolefin such as polyethylene or polypropylene is blended with a clarity-enhancing polymer that is preferably styrene-ethylene-butadiene-styrene (SEB-S) block copolymer. The polyolefin provides an economical structural component that is relatively much more environmentally friendly than PVC. It also is crystalline and therefore enables film orientation upon processing if desired. As noted, that orientation generates toughness in the machine and transverse directions. The SEB-S block copolymer provides clarity, a reduction in haze, and improved gloss when desired. The polyolefin-SEB-S blend provides better clarity and elongation characteristics than machine-oriented films, an important feature particularly when the film is to be adhesively coupled to a flexible structure such as a toothpaste tube.

These and other advantages of the present invention will become apparent upon review of the following detailed description, the accompanying drawing, and the appended claims.

BRIEF DESCRIPTION OF THE DRAWING

The FIGURE is a simplified diagrammatic diagram of the processing technique of the present invention, showing the mixing of the novel unitary mixtures and blends of the present invention prior to orientation and stretching when that orienting method is to be employed.

DESCRIPTION OF THE PREFERRED EMBODIMENTS OF THE INVENTION

Figure 1:
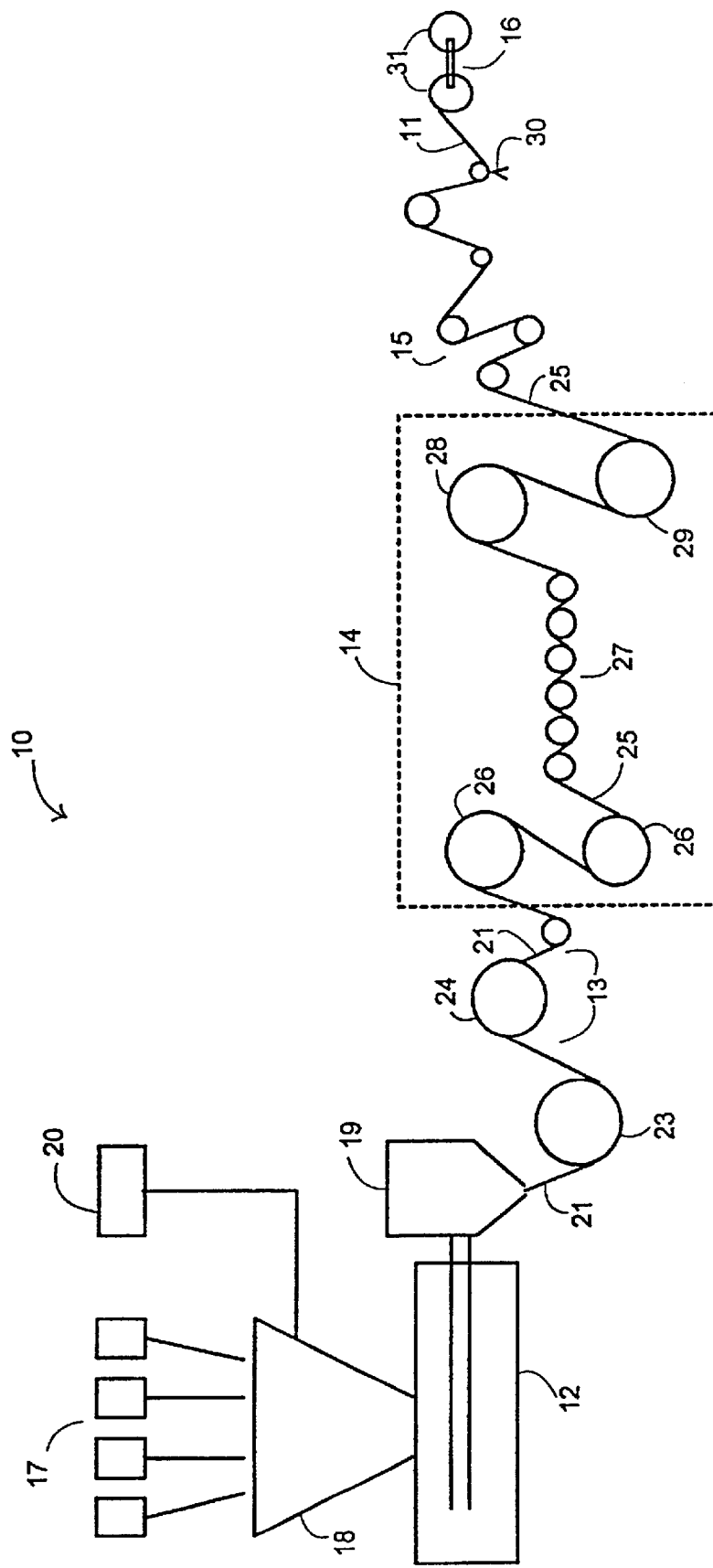

The FIGURE shows a simplified diagrammatic view of a film fabrication system 10 used in the novel fabrication process of the present invention to create a novel monolayer printable film facestock 11. Primary components of the system 10 include an extruder 12, a casting unit 13, a film-orientation unit 14, a corona treatment unit 15, and an end-product winder 16.

As earlier noted, the novel technique of the present invention is to combine a primary structural material, preferably a polypropylene homopolymer or a polypropylene copolymer, with a secondary printable material, preferably vinyl-acetate or methacrylate in a carrier, which carrier may be polyethylene, prior to delivery to the extruder 12. It is to be noted that the primary structural material may be polyethylene or a copolymer of polyethylene and polypropylene. The materials may be in pellet or other suitable form, and may include one or more supplemental components delivered via chutes of a component feeder 17 into a mix hopper 18. All of the components are then transferred from the hopper 18 into the extruder 12 for mixing at a temperature of about 460° F. prior to transfer to a die 19. The extruder 12 and the die 19 can be of any type known to those skilled in the art to be suitable for mixing and extruding components of the type described herein. It is to be understood that the particular means for mixing the structural material and the printable material is not the key to the invention, rather, it is that the mixing occurs prior to and during extrusion and film forming. In particular, the primary and secondary materials are fluid-like in the extruder 12, and as they emerge from the die 19, so that mixing does, in fact, occur. This is clearly distinct from the prior art, which involves extrusion of two distinct layers of material, one acting as the structural component and the other acting as the printable component.

It is important to note that in order for a sufficient quantity of vinyl acetate to bloom to the surface of the film facestock 11, it is necessary to add enough of the secondary material such that a unitary mixture 21 coming from the die 19 has at least 5% by weight of the printable material, such as the VA or the MA. In the preferred embodiment of the present invention, where the facestock 11 is a clear product, the unitary mixture 21 includes about 70% by weight of the homopolymer polypropylene and about 30% by weight of a VA-containing material that may be EVA with 30% by weight VA, resulting in about 9% by weight VA. It is to be understood that similar amounts of EMA and MA may be substituted for the EVA and the VA. Alternatively, VA or MA alone may be added to the mix provided the weight percentage is adjusted accordingly. If the facestock 11 is to be white, a white concentrate may be added and the amount of polypropylene reduced by an equivalent amount. Other components may be added to the mix in order to enhance various characteristics of the end-product film 11. It is important, however, that the end mixture at the die 19 include at least 5%, and preferably about 7%, by weight of the secondary printable material. The VA- or MA-carrier material may be obtained from any of a variety of sources, including, but not limited to Exxon-Mobil Corporation of Texas.

After the mixing of the primary and secondary materials, the unitary mixture 21 is then transferred from the die 19 to a first casting chiller roll 23. The unitary mixture 21 containing a blending of the primary structural material and the secondary printable material is approximately, but is not limited to, 10–12 mils thick as it moves to the first casting chiller roll 23. The unitary mixture 21 moves from the first chiller roll 23 to a second casting chiller roll 24. Rolls 23 and 24 may be of any suitable temperature, but preferably about 100° F. This chilling of the unitary mixture 21 acts to solidify it into a film-like material. From the second chiller roll 24, the unitary mixture 21 is delivered to the film-orientation unit 14. It is in this part of the system 10 that the process of the present invention is unique. In the orientation unit 14 the unitary mixture 21 is stretched and oriented into a monolayer film 25 that can range in thickness from about 1–3 mils, but can be something thinner or thicker than that range. A pre-heater pair of rollers 26 at a temperature of about 200° F.–240° F. warm and begin softening the mixture 21 that is a film after the chill casting stage of the process. A series of stretching rollers 27 at a temperature of about 240° F. act to considerably increase the length of the film 25. That step thins the film 25 while creating a unidirectional molecular orientation that provides increased strength and stiffness in the film 25. It is possible to provide the facestock 11 without this specific stretching step; however, the resultant film may have less strength, stiffness, and clarity than that developed during stretching.

In the prior-art systems, the remainder of the orientation process operates at approximately 240° F.–250° F. However, in the next stage of the present invention, the orientation process heat setting and then stress-relieving or relaxing of the film 25 occurs as the film 25 is transferred to a heat-stabilization roller 28, which may be one or more rollers, that is/are at a temperature in the range of about 270° F. to about 295° F. This imparts better stiffness and flatness in the end product in that the film 25 is unstressed as it moves across a cooling roller 29 that may be at ambient temperature. The heat-set rollers have individual drive controllers between two or more individual rollers so as to control the speed of the film passing therethrough. This is important to maintain the flow of the product through the continuous process. It also effectively controls the "necking down" of the film to the reduced thicknesses noted. The rollers 28 are preferably formed with a high-chrome finish of 1–2 RMS. The resulting tight tolerance between successive rollers, combined with the higher processing temperature yields a monolayer film with greater imparted transverse strain characteristics (strength and stiffness) than was possible in prior printable films. In particular, a printable monolayer film having a TD-stiffness-to-MD-stiffness ratio of about ¾ has been developed in this way.

From the orientation unit 14 the film 25 moves to the corona-treatment unit 15 where the film surface is further enhanced for printing in a manner well known to those skilled in the art. Final processing of the film may include cutting of rough film edges by a slitter 30. Scraps of the film 25 from the slitting process may be returned to a secondary feeder 20 for re-introduction into the process and subsequent use. The final film facestock 11 is then wound onto transfer rolls 31 of the winder unit 16 for delivery to users.

The novel process described herein results in the formation of the facestock 11 that is a monolayer film having structural integrity and a vinylacetate or a methacrylate surface bloom occurring at or about roller 28 that renders the surface of that film suitable for printing using many standard printing techniques.

In another embodiment of the present invention, the primary structural material is a polyolefin such as polyethylene or preferably polypropylene. The secondary material is a clarity enhancer that is preferably SEB-S. The two are blended in a ratio of about 10% by weight SEB-S and the remainder the structural material. The SEB-S may be something such as Tuftec® supplied by Asahi Chemical of Japan. Optionally, supplemental additives such as color modifiers, finish modifiers, and the like may be added to form the unitary mixture 21 into the film facestock 11 with particular appearance characteristics.

The unitary mixture 21 formed primarily of the structural material and the clarity enhancing material may be extruded, cast, or machine-direction oriented as described above with respect to the high bidirectional strength material. It is preferably stretched in the manner indicated herein to reach suitable film thickness. Alternatively, it may be formed with some shrinkage capacity if it is to be employed as a shrink-warp film. The film made with the polyolefin and the clarity-enhancer may also be oriented in a cross-wise (bi-directional) manner using a tenter frame and oven. The film may be corona treated to improve surface tension, including to improve printability. Edge trim removal and winding into rolls completes the film fabrication manner substantially as outlined with regard to the FIGURE.

The blend described provides a suitable replacement for PVC films. It employs less expensive components and has elongation and clarity characteristics desirable in a film to be applied to pliable base structures. Further, addition of a printable material such as VA or MA to the polypropylene-SEB-S combination results in a soft, conformable, clear and printable film. It is to be noted, however, that addition of the printable material may cause some reduction in film clarity. The haze factor associated with the blend of the present invention is about 5% or less—substantially less than the haze values of 7%–17% associated with current non-PVC films. It is to be noted that the blended film may be employed as a monolayer film or in a laminate with complementary film layers, bearing in mind curling concerns associated with such laminations.

The invention description herein is directed to specific embodiments, however, it is apparent that many modifications, variations, and equivalents may be implemented by one skilled in the art without departure from the spirit and scope of the novel concepts of the present invention.

What is claimed is:

1. A monolayer polymeric film comprising a mixture of a structural polymeric material and a second polymeric material, said second polymeric material including a printable material, wherein the monolayer polymeric film is formed by mixing said structural polymeric material and said second polymeric material together without an additional coupling additive to form a unitary mixture, stretching said unitary mixture, heat stabilizing said unitary mixture on one or more heat stabilization rollers at a temperature sufficient to cause a portion of said printable material of said second polymeric material to bloom to a surface of said unitary mixture, wherein said structural polymeric material is selected from the group consisting of polyethylene, polypropylene and a polyethylene-polypropylene copolymer and said secondary polymeric material is selected from the group consisting of ethyl-vinyl-acetate copolymer and ethyl-methacrylate copolymer, and wherein the steps associated with forming the monolayer polymeric film include restricting shrinkage of said unitary mixture in a transverse direction.

2. The monolayer polymeric film as claimed in claim 1 wherein the step of restricting shrinkage in the transverse direction includes directing said unitary mixture to said one or more heat stabilization rollers and providing the one or more heat stabilization rollers with a high-chrome finish of less than 8 RMS.

3. The monolayer polymeric film as claimed in claim 1 wherein the step of restricting shrinkage of said unitary mixture in the transverse direction produces a transverse direction stiffness to machine direction stiffness ratio in the monolayer polymeric film of about ¾ to one.

4. A monolayer polymeric film comprising a mixture of a structural polymeric material and a second polymeric material, wherein the monolayer polymeric film is formed by mixing said structural polymeric material and said second polymeric material together without an additional coupling additive to form a unitary mixture, stretching said unitary mixture, heat stabilizing said unitary mixture on one or more heat stabilization rollers, wherein said structural polymeric material is selected from the group consisting of polyethylene, polypropylene and a polyethylene-polypropylene copolymer and said secondary polymeric material is styrene-ethylene-butadiene-styrene copolymer, and wherein the steps associated with forming the monolayer polymeric film include restricting shrinkage of said unitary mixture in a transverse direction.

5. The monolayer polymeric film as claimed in claim 4 wherein the step of restricting shrinkage in the transverse direction includes directing said unitary mixture to said one or more heat stabilization rollers and providing the one or more heat stabilization rollers with a high-chrome finish of less than 8 RMS.

6. The monolayer polymeric film as claimed in claim 4 wherein the step of restricting shrinkage of said unitary mixture in the transverse direction produces a transverse direction stiffness to machine direction stiffness ratio in the monolayer polymeric film of about ¾ to one.

7. The monolayer polymeric film as claimed in claim 4 further comprising a third polymeric material, said third polymeric material including a printable material, wherein said third polymeric material is selected from the group consisting of ethyl-vinyl-acetate copolymer and ethyl-methacrylate copolymer.

\* \* \* \* \*